Patented June 6, 1950

2,510,870

UNITED STATES PATENT OFFICE 2,510,870

INSECTICIDAL COMPOSITION COMPRISING 1.1 - DI - (4 - CHLOROPHENYL) - 2.2.2 - TRICHLORO - ETHANE AND 1.1 - DI - (MONOCHLORO - PHENYL) - ETHANE

Curtis E. Dieter and Bernard J. Thiegs, Midland, Mich., assignors to The Dow Chemical Company, Midland, Mich., a corporation of Delaware No Drawing. Application May 9, 1946, Serial No. 668,479

4 Claims. (Cl. 167—30)

This invention relates to insecticides and is particularly concerned with a novel insecticidal composition comprising as active toxicants mixtures of halo-diaryl-alkanes, and a method for control of orchard insects therewith.

An outstanding development in the field of synthetic organic insecticides has been the discovery of 1,1-di-(4-chlorophenyl)-2,2,2-trichloroethane (DDT). This compound in admixture with various extenders, spreaders, and carriers has proven effective against a large number of insect organisms. Compositions comprising DDT have found wide application not only for the control of household pests but also in field and orchard operations. However, certain limitations of the new toxicant threaten materially to restrict the scope of its acceptance.

The principal shortcoming of DDT is its specificity whereby it may provide complete control of many insect pests while being substantially innocuous to others. Thus, when applied to orchards and groves for the control of codling moth, scale, etc., it also kills many of the beneficial parasites normally infesting the host trees but does not exert a toxic action upon aphids, spiders, and mites. The resulting disruption of normal biological balance permits and encourages the building up of such high populations of the unaffected organisms as frequently results in appreciable damage to both trees and fruit. While such build up of undesirable organisms can be prevented by the judicious application of supplementary parasiticides, the need for an all-purpose toxicant mixture is apparent.

It is an object of the present invention to provide an improved insecticidal composition comprising DDT. A further object is the provision of a toxicant mixture comprising DDT which will be effective against a wider range of insect and mite organisms than existing compositions of this type. An additional object is to provide a mixture of toxic materials which will exert a synergistic effect one with the other so that the control of insect pests is accomplished with smaller amounts of the mixture than with either toxicant alone. Another object is to provide an improved method for the control of orchard insects. Other objects will become apparent from the following specification.

According to the present invention, it has been discovered that 1,1 - di - (monochlorophenyl) - ethane and 1,1-di-(4-chloro-phenyl) - 2,2,2 - trichloro-ethane (DDT) may be mixed together to produce an insecticidal product of unusual potency. This combination of toxicants exerts a killing effect upon insect organisms which is greater than additive with respect to the effect exerted by its components separately, and is effective against a much larger number of insect organisms than either of the constituent halohydrocarbons. The new composition is particularly well adapted for application as an aqueous dispersion to the trees of insect infested orchards and groves for the control of codling moth, scale, aphid, spider, and mite insects.

When operating in accordance with the present invention, the two toxicant materials may simply be mixed together to produce a concentrate adapted to be subsequently diluted with a suitable carrier and applied for the control of insect pests. Other constituents of such a concentrate mixture may be wetting, emulsifying, or dispersing agents, e. g. sulfonated alcohols, soaps, metallic caseinates, polyglycol derivatives, etc. Also, the toxicants may be ground or otherwise dispersed in and through a finely divided solid carrier, e. g. pyrophyllite, diatomaceous earth, talc, wood flour, volcanic ash, etc., and the resulting mixture employed as a concentrate. Similarly, combinations of wetting agents and solid extenders may be employed.

In other operations, the toxicants in mixture or separately may be dissolved or dispersed in suitable liquid carriers. Thus, the two materials may simply be dissolved in petroleum distillate, alcohol, methylethyl ketone, ethylene chloride, etc., to produce household insecticide sprays. A further and preferred embodiment comprises dispersing the toxicants in water along with a suitable wetting, dispersing, and emulsifying agent to produce sprays adapted from field, grove, and orchard application. A further embodiment includes dispersing the mixture in low concentration on a powder such as pyrophyllite or diatomaceous earth and applying the latter to infested plant surfaces as a dust.

Regardless of how employed, it is understood that the ultimate composition must contain sufficient of the toxicant mixture and the components must be in such proportion one to the other as to accomplish the control of the insect organism. While any suitable proportions of toxicants may be employed, from about 0.3 to 7 parts by weight of the 1,1-di-(monochloro-phenyl)-ethane per part of 1,1-di-(4-chloro-phenyl)-2,2,2-trichloro-ethane has been found to give good results. Spray mixtures should contain from about 0.001 to 3.0 per cent of such mixture, and dusts from 0.25 to 5.0 per cent, all depending upon the particular organism to be employed and the conditions of operation.

A preferred embodiment of the invention consists of compositions in which DDT is combined with the crude reaction product of monochloro-benzene and ethylidene dichloride. This reaction product is high in 1,1-di-(monochloro-phenyl)-ethanes but also contains an appreciable amount of complex by-products in which a multiplicity of ethylidene and monochloro-phenyl radicals are associated with each other to produce long chain structures. This crude product has been found to be appreciably more effective as a constituent of insecticidal compositions than any of the pure compounds which may be isolated therefrom. It appears that the several products of reaction exert a synergistic action one with the other, whereby the toxicity of the crude product is significantly higher than that of any individual component.

The reaction of monochloro-benzene and ethylidene dichloride is readily accomplished by mixing one with the other in the presence of anhydrous aluminum chloride. A respresentative preparation is as follows:

742 grams of ethylidene dichloride is added portion-wise and with stirring at a temperature of 40°–50° C. to a dispersion of 30 grams of anhydrous aluminum chloride in 3380 grams of monochloro-benzene. The time required for addition is two hours. After all of the ethylidene dichloride has been added, the mixture is stirred for two hours, during which time an additional 10 grams of aluminum chloride is added portion-wise to the reaction mixture. The mixture is then treated with an excess of 5 per cent aqueous hydrochloric acid to decompose the aluminum chloride. The water-immiscible layer is separated from the mixture, treated with solid sodium carbonate, filtered, washed with water, and dried. The excess and unreacted monochloro-benzene is recovered by distillation at atmospheric pressure. The residue constitutes the crude product of reaction and may be employed in the preparation of insecticidal mixtures without further purification. The crude product may be fractionally distilled under reduced pressure to obtain an oily material, boiling at 157°–160° C. at 4 mm. pressure. This product consists essentially of a mixture of 1,1-di-(monochloro-phenyl)-ethanes, and is also employed as a toxicant material. If this oily product is allowed to stand at temperatures of from −10° to +10° C. for a period of time, it crystallizes in part. The crystals may be recovered by filtration to obtain 1,1-di-(4-chloro-phenyl)-ethane melting at 53°–54° C. when crystallized out of ethyl alcohol.

In a representative operation as described above, the crude reaction product contains from about 70 per cent to about 80 per cent of 1,1-di-(monochloro-phenyl)-ethanes in the proportion of about 70 per cent para to 30 per cent ortho isomer. The remaining 20 to 30 per cent of the reaction product consists of the complex long chain structures as previously described.

The following examples illustrate the invention, but are not to be construed as limiting.

Example 1

An insecticide concentrate (A) was prepared by grinding together 50 parts by weight of 1,1-di-(4-chloro-phenyl)-2,2,2-trichloro-ethane (DDT), 2 parts of Triton X–100 (polyethylene glycol phenyl isooctyl ether), 2 parts of a commercial dispersing agent marketed as Daxad #27, and 46 parts of a clay (Diluex).

90 parts by weight of the undistilled reaction product of ethylidene dichloride and monochloro-benzene, as described above, and 10 parts of Aerosol OT (di-octyl sodium sulfosuccinate) were mixed together to form a further concentrate (B).

The foregoing concentrate compositions were employed to produce spray mixtures comprising both taxicants and each toxicant separately.

In a representative operation, concentrates A and B were dispersed in water to form a spray composition comprising 0.25 pound of DDT and 0.75 pound of 1,1-di-(monochloro-phenyl)-ethane for 100 gallons of dispersion.

The resulting composition was sprayed in conventional fashion upon bean plants heavily infested with the third instar larvae of Mexican bean beetle. 72 hours after application, it was found that an 85 per cent mortality of the beetle larvae had resulted and that there was only 15 per cent feeding on the bean leaves.

In analogous determinations, the DDT concentrate A in amount to provide 0.25 pound of toxicant per 100 gallons gave 0 per cent control of the larvae and permitted 90 per cent feeding. The 1,1-di-(monochloro-phenyl)-ethane concentrate in amount to provide 0.75 pounds per 100 gallons gave only 5 per cent control and permitted 90 per cent feeding of the larvae.

Example 2

A similar operation was carried out with the two concentrates being dispersed in water to produce an aqueous spray composition comprising 0.75 pound of DDT and 0.25 pound of the crude 1,1-di-(monochloro-phenyl)-ethane product. In this determination, 78 per cent of the surface of the bean leaves were unattacked by the bean beetle larvae. In an application using 0.75 pound of DDT alone per 100 gallons, only 60 per cent of the bean leaf surface was unattacked. A composition of 0.25 pound of the 1,1-di-(monochloro-phenyl)-ethane product per 100 gallons was similarly applied and permitted 90 per cent feeding.

Example 3

A composition was prepared from 2.5 parts by weight of DDT, 2.5 parts of 1,1-di-(monochloro-phenyl)-ethane and 95 parts of pyrophyllite by wetting the pyrophyllite with an acetone solution of the toxicants and drying and grinding the resulting mixture. This composition was dusted on beans infested with the Mexican bean beetle larvae. 72 hours after application, the extent of feeding was determined as amounting to only 5 per cent.

Exactly comparable operations in which 2.5 parts by weight of DDT and of 1,1-di-(monochloro-phenyl)-ethane were separately dusted each in admixture with 97.5 parts of pyrophyllite, permitted 40 per cent and 95 per cent feeding, respectively. The estimated mortality on larvae for the composition containing the mixed toxicants was 40 per cent. The compositions containing the toxicants separately failed to give any kill of the larvae.

Further comparisons were made with dust compositions containing 5 per cent of DDT and 5 per cent of 1,1-di-(monochloro-phenyl)-ethane separately. The DDT composition gave but 20 per cent control and permitted 20 per cent feeding. The 1,1-di-(monochloro-phenyl) - ethane composition permitted 82 per cent feeding and gave 0 per cent control.

*Example 4*

A composition was prepared containing 0.075 pound of DDT, 0.5 pound of 1,1-di-(monochloro-phenyl)-ethane and 0.025 pound of an emulsifying agent marketed as Aerosol OT (di-octyl sodium sulfosuccinate) per 100 gallons of water. This composition was applied for the control of black bean aphid on nasturiums, red spider on beans, and Southern army worm on beans. 72 hours after application, this treatment had resulted in a 96 per cent kill of the bean aphid, 76 per cent kill of red spider, and 100 per cent control of Southern army worm. The composition permitted only 12 per cent feeding by the latter.

DDT alone at 0.075 pound in 100 gallons of water containing 0.025 pound of Aerosol OT gave 0 per cent control against bean aphid and red spider and permitted 35 per cent feeding on foliage in the Southern army worm determination. 1,1-di-(monochloro-phenyl)-ethane at 0.5 pound per 100 gallons of water containing 0.025 pound of Aerosol OT gave 0 per cent kill against bean aphid, 69 per cent kill against red spider and permitted 100 per cent feeding in the Southern army worm determination.

*Example 5*

A composition comprising 0.15 pound of DDT, 1.0 pound of 1,1-di-(monochloro-phenyl)-ethane and 0.05 pound of Aerosol OT per 100 gallons of water was applied for the control of Mexican bean beetle larvae on beans. This composition gave 100 per cent control of the larvae and permitted only 7 per cent feeding. Exactly analogous determinations employing spray compositions containing 0.05 pound of Aerosol OT and 0.15 pound of DDT and 1.0 pound of 1,1-di-(monochloro-phenyl)-ethane separately gave 0 per cent kill of Mexican bean bettle larvae and permitted 95 per cent feeding.

We claim:

1. An insecticidal composition comprising as active toxicants 1,1-di-(4-chloro-phenyl)-2,2,2-trichloro-ethane and 1,1-di-(monochloro-phenyl)-ethane, and wherein the mixture of toxicants exerts a synergistic effect as regards insecticidal toxicity.

2. An insecticidal composition comprising as active toxicants one part by weight of 1,1-di-(4-chloro-phenyl)-2,2,2-trichloro-ethane and from about 0.3 to 7 parts of 1,1-di-(monochloro-phenyl)-ethane, and wherein the mixture of toxicants exerts a synergistic effect as regards insecticidal toxicity.

3. An insecticidal composition comprising as active toxicants 1,1-di-(4-chloro-phenyl)-2,2,2-trichloro ethane, 1,1-di-(monochloro-phenyl)-ethane, and products of the reaction of ethylidene dichloride with monochloro-benzene other than 1,1-di-(monochloro-phenyl)-ethane, and wherein the mixture of toxicants exerts a synergistic effect as regards insecticidal toxicity.

4. An aqueous insecticidal spray comprising as active toxicants 1,1-di-(4-chloro-phenyl)-2,2,2-trichloro-ethane and 1,1-di-(monochloro-phenyl)-ethane, and wherein the mixture of toxicants exerts a synergistic effect as regards insecticidal toxicity.

CURTIS E. DIETER.
BERNARD J. THIEGS.

REFERENCES CITED

The following references are of record in the file of this patent:

UNITED STATES PATENTS

| Number | Name | Date |
| --- | --- | --- |
| Re. 22,700 | Muller | Dec. 4, 1945 |
| 2,243,543 | Ter Horst | May 27, 1941 |
| 2,402,896 | Kerr | June 25, 1946 |

OTHER REFERENCES

Annular Report of the Agricultural and Horticultural Research Sta., Long Ashton, Bristol, 1944, page 133.

Beilstein, 4th ed., vol. 4, page 605 and vol. 5, 2nd supplement, page 510.

Soap and Sanitary Chemicals, January 1943, pages 95 and 96, by Roarck.